(12) United States Patent
Zhang

(10) Patent No.: US 11,340,631 B2
(45) Date of Patent: *May 24, 2022

(54) SELF-DRIVING CAR SCHEDULING METHOD, CAR SCHEDULING SERVER, AND SELF-DRIVING CAR

(71) Applicant: Huawei Technologies Co., Ltd., Shenzhen (CN)

(72) Inventor: Huimin Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

This patent is subject to a terminal disclaimer.

(21) Appl. No.: 16/527,871

(22) Filed: Jul. 31, 2019

(65) Prior Publication Data

US 2019/0354112 A1 Nov. 21, 2019

Related U.S. Application Data

(63) Continuation of application No. 15/343,603, filed on Nov. 4, 2016, now Pat. No. 10,409,289, which is a (Continued)

(30) Foreign Application Priority Data

May 6, 2014 (CN) .......................... 201410187463.3

(51) Int. Cl.
*G05D 1/02* (2020.01)
*G08G 1/00* (2006.01)
(Continued)

(52) U.S. Cl.
CPC ......... *G05D 1/0287* (2013.01); *G05D 1/0027* (2013.01); *G05D 1/0285* (2013.01);
(Continued)

(58) Field of Classification Search
CPC .. G05D 1/0027; G05D 1/0088; G05D 1/0285; G05D 1/0287; G05D 1/0297;
(Continued)

(56) References Cited

U.S. PATENT DOCUMENTS

| | | |
|---|---|---|
| 5,168,451 A | 12/1992 | Bolger |
| 5,604,676 A | 2/1997 | Penzias |

(Continued)

FOREIGN PATENT DOCUMENTS

| | | | | |
|---|---|---|---|---|
| CH | 691204 A5 * | 5/2001 | ............ | G08G 1/127 |
| CN | 1588476 A | 3/2005 | | |

(Continued)

OTHER PUBLICATIONS

EPO machine translation of JP 2012-048563 (original JP document published Mar. 8, 2012) (Year: 2012).*

(Continued)

*Primary Examiner* — David A Testardi
(74) *Attorney, Agent, or Firm* — Conley Rose, P.C.

(57) ABSTRACT

A self-driving car scheduling method, a car scheduling server, and a self-driving car includes receiving a ride request; determining, according to the ride request and driving information of self-driving cars within a management range, at least one first candidate car from the multiple self-driving cars; calculating a first time required by each first candidate car to arrive at a ride destination according to current location information, current road status information, and planned route information of each first candidate car; determining a final candidate car from the at least one first candidate car according to the first time corresponding to each first candidate car.

18 Claims, 6 Drawing Sheets

Related U.S. Application Data continuation of application No. PCT/CN2015/078259, filed on May 5, 2015.

(51) Int. Cl.

| | |
|---|---|
| G06Q 10/04 | (2012.01) |
| G05D 1/00 | (2006.01) |
| H04W 4/024 | (2018.01) |
| G06Q 10/06 | (2012.01) |
| G06Q 50/26 | (2012.01) |
| G08G 1/127 | (2006.01) |
| H04W 4/02 | (2018.01) |
| G06Q 10/10 | (2012.01) |
| G06Q 50/30 | (2012.01) |

(52) U.S. Cl.
CPC ......... *G05D 1/0297* (2013.01); *G06Q 10/047* (2013.01); *G06Q 10/06* (2013.01); *G06Q 10/1093* (2013.01); *G06Q 50/26* (2013.01); *G08G 1/127* (2013.01); *G08G 1/202* (2013.01); *H04W 4/02* (2013.01); *H04W 4/024* (2018.02); *G06Q 50/30* (2013.01)

(58) Field of Classification Search
CPC .... G08G 1/202; G01C 21/26; G01C 21/3492; G01C 21/3626; G01C 21/343; G06Q 10/047; G06Q 50/30; B60W 60/0021; B60W 60/0024; B60W 60/00253
See application file for complete search history.

(56) References Cited

U.S. PATENT DOCUMENTS

| | | | |
|---|---|---|---|
| 6,240,362 B1* | 5/2001 | Gaspard, II | G01C 21/343 340/991 |
| 7,536,256 B2 | 5/2009 | Kelley et al. | |
| 8,630,897 B1* | 1/2014 | Prada Gomez | G06Q 30/0241 705/14.11 |
| 9,494,938 B1* | 11/2016 | Kemler | G05D 1/0022 |
| 9,665,101 B1* | 5/2017 | Templeton | G01C 21/3461 |
| 10,409,289 B2* | 9/2019 | Zhang | G06Q 10/1093 |
| 10,477,159 B1* | 11/2019 | Fredinburg | H04N 7/183 |
| 10,821,887 B1* | 11/2020 | Kemler | G06Q 10/02 |
| 2001/0056396 A1 | 12/2001 | Goino | |
| 2002/0186144 A1* | 12/2002 | Meunier | G07B 15/00 340/4.6 |
| 2006/0034201 A1* | 2/2006 | Umeda | G06Q 30/02 370/310 |
| 2006/0059023 A1 | 3/2006 | Mashinsky | |
| 2006/0259353 A1* | 11/2006 | Gutmann | G06Q 10/02 705/13 |
| 2007/0288155 A1* | 12/2007 | Kaneda | G01C 21/343 701/465 |
| 2008/0120021 A1* | 5/2008 | Kaneda | G08G 1/123 701/533 |
| 2009/0327011 A1 | 12/2009 | Petroff | |
| 2012/0165978 A1 | 6/2012 | Li et al. | |
| 2012/0290652 A1 | 11/2012 | Boskovic | |
| 2013/0061044 A1 | 3/2013 | Pinkus et al. | |
| 2013/0231824 A1* | 9/2013 | Wilson | G01C 21/3415 701/26 |
| 2014/0172727 A1* | 6/2014 | Abhyanker | G06Q 30/0645 705/307 |
| 2014/0358353 A1* | 12/2014 | Ibanez-Guzman | G05D 1/0027 701/23 |
| 2014/0365250 A1* | 12/2014 | Ikeda | G06Q 50/30 705/5 |
| 2015/0199619 A1 | 6/2015 | Ichinose et al. | |
| 2015/0185034 A1 | 7/2015 | Abhyanker | |
| 2015/0239436 A1 | 8/2015 | Kanai et al. | |
| 2015/0285645 A1 | 10/2015 | Maise et al. | |
| 2016/0301698 A1 | 10/2016 | Katara et al. | |
| 2016/0327949 A1* | 11/2016 | Wilson | G01C 21/3415 |
| 2017/0008490 A1* | 1/2017 | Sako | B60R 25/25 |
| 2017/0123423 A1* | 5/2017 | Sako | G05D 1/0088 |
| 2017/0270796 A1* | 9/2017 | Kawagishi | G01C 21/3685 |
| 2017/0286884 A1 | 10/2017 | Shoval et al. | |
| 2017/0300848 A1 | 10/2017 | Shoval et al. | |
| 2019/0299933 A1* | 10/2019 | Suzuki | G07C 9/00571 |
| 2019/0354112 A1* | 11/2019 | Zhang | G06Q 10/1093 |

FOREIGN PATENT DOCUMENTS

| | | | |
|---|---|---|---|
| CN | 101004858 A | 7/2007 | |
| CN | 101355714 A | 1/2009 | |
| CN | 101527061 A | 9/2009 | |
| CN | 101905702 A | 12/2010 | |
| CN | 102270386 A | 12/2011 | |
| CN | 102270389 A | 12/2011 | |
| CN | 102426780 A | 4/2012 | |
| CN | 102592444 A | 7/2012 | |
| CN | 102855756 A | 1/2013 | |
| CN | 103000023 A | 3/2013 | |
| CN | 103473924 A | 12/2013 | |
| EP | 1106968 A1 * | 6/2001 | ........... G01C 21/343 |
| FR | 2692064 A1 | 12/1993 | |
| GB | 2501075 A | 10/2013 | |
| JP | 2002259518 A | 9/2002 | |
| JP | 2003024390 A | 1/2003 | |
| JP | 2003242592 A * | 8/2003 | |
| JP | 2003263696 A * | 9/2003 | |
| JP | 2008117076 A * | 5/2008 | |
| JP | 2012048563 A * | 3/2012 | |
| JP | 2013076643 A | 4/2013 | |
| WO | 2004008799 A1 | 1/2004 | |

OTHER PUBLICATIONS

Fagnant, Daniel J., "The travel and environmental implications of shared autonomous vehicles, using agent-based model scenarios", Transportation Research Part C, vol. 40 (2014), Mar. 2014, pp. 1-13. (Year: 2014).*

Translation of FR 2692064 (original FR document published Dec. 10, 1993) (Year: 1993).

JPO machine translation of JP 2013-076643 (original JP document published Apr. 25, 2013) (Year: 2013).

Wikipedia article, "Vehicle Information and Communication System," Old revision dated Mar. 14, 2013, 2 pages. (Year: 2013).

International Search Report dated Jun. 29, 2015, in corresponding International Application No. PCT/CN2015/078259.

Office Action dated Sep. 29, 2017, in Chinese Application No. 201410187463.3, 15 pages.

* cited by examiner

SELF-DRIVING CAR SCHEDULING METHOD, CAR SCHEDULING SERVER, AND SELF-DRIVING CAR

CROSS-REFERENCE TO RELATED APPLICATIONS

This application is a continuation application of U.S. application Ser. No. 15/343,603, filed on Nov. 4, 2016, which is a continuation application of International Application No. PCT/CN2015/078259, filed on May 5, 2015, which claims priority to Chinese Patent Application No. 201410187463.3, filed on May 6, 2014. All of the aforementioned patent applications are hereby incorporated by reference in their entireties.

TECHNICAL FIELD

The present disclosure relates to the field of computer technologies, and in particular, to a self-driving car scheduling method, a car scheduling server, and a self-driving car.

BACKGROUND

A self-driving car is also referred to as a driverless car, a computer driving car, or a wheeled mobile robot, and is an intelligent car that implements unmanned driving using a computer system. The self-driving car relies on coordination among an artificial intelligence system, a visual computation system, a radar system, a monitoring system, and a global positioning system, such that a computer can automatically and safely operate the self-driving car without an active operation of a person. As self-driving cars become popularized, at present it becomes an emerging means of travel to use a self-driving car as a taxi. To enable self-driving cars used as taxis to maximally meet different ride requirements, how to schedule the self-driving cars becomes a problem to which a person skilled in the art pays relatively much attention.

In other approaches, cars are usually scheduled in the following manner. A car scheduling server receives each ride request by means of a telephone, where a ride request includes a location of the ride request; every time when a new ride request is received, the car scheduling server acquires a location of each car within a management range, and determines, from assigned cars, cars located within a preset range of a location corresponding to the new ride request; and finally, determines, from the cars within the preset range, a car having a minimum increase in a driving distance after the new ride request is added, and assigns the new ride request to the car.

In a process of implementing the present disclosure, the inventor finds that other approaches at least have the following problems.

In a process of car scheduling, because car scheduling is performed according to only locations of assigned cars and a ride request, reference factors for scheduling are undiversified, causing low scheduling precision. For example, after a car that responds to a new ride request is determined, if there is a real-time severe traffic jam at a location of the car or a traffic accident occurs on a driving course, the selected car cannot necessarily arrive at a location corresponding to the new ride request soonest, and scheduling precision is affected.

SUMMARY

To resolve the problem in other approaches, embodiments of the present disclosure provide a self-driving car scheduling method, a car scheduling server, and a self-driving car. The technical solutions are as follows.

According to a first aspect, a self-driving car scheduling method is provided, including receiving a ride request, where the ride request includes at least a ride starting location, a ride destination, and an expected destination arrival time; determining, according to the ride request and driving information of self-driving cars within a management range, at least one first candidate car from the multiple self-driving cars; calculating, according to current location information, current road status information, and planned route information of each first candidate car, a first time required by each first candidate car to arrive at the ride destination; determining a final candidate car from the at least one first candidate car according to the first time corresponding to each first candidate car, where the final candidate car at least meets the expected destination arrival time, and delivering the ride request to the final candidate car, such that the final candidate car responds to the ride request.

In a first possible implementation manner of the first aspect, before the determining, according to the ride request and driving information of self-driving cars within a management range, at least one first candidate car from the multiple self-driving cars, the method further includes acquiring the driving information of the self-driving cars within the management range, where the driving information includes at least current location information, current road status information, planned route information, and a planned destination arrival time; and the determining, according to the ride request and driving information of self-driving cars within a management range, at least one first candidate car from the multiple self-driving cars includes determining the at least one first candidate car from the multiple self-driving cars according to the ride starting location and the ride destination, where a planned route or an extended route of the planned route of the first candidate car includes the ride starting location and the ride destination.

With reference to the first possible implementation manner of the first aspect, in a second possible implementation manner of the first aspect, before the determining the at least one first candidate car from the multiple self-driving cars according to the ride starting location and the ride destination, the method further includes, if the ride request includes ride sharing information and a quantity of passengers, determining, from the self-driving cars within the management range, at least one second candidate car that has vacant seats whose quantity is not less than the quantity of passengers and that agrees with ride sharing; and the determining the at least one first candidate car from the multiple self-driving cars according to the ride starting location and the ride destination includes determining the at least one first candidate car from the at least one second candidate car according to the ride starting location and the ride destination.

With reference to the first aspect, in a third possible implementation manner of the first aspect, the ride request further includes passenger information, and the delivering the ride request to the final candidate car includes delivering the ride request including the passenger information to the final candidate car, such that after arriving at the ride starting location, the final candidate car determines a sender of the ride request according to the passenger information, where the passenger information includes at least one of a passenger feature identifier or a passenger nearby typical road identifier.

With reference to the first aspect, in a fourth possible implementation manner of the first aspect, after the delivering the ride request to the final candidate car, the method further includes sending security verification information of the final candidate car to a sending terminal of the passenger request, such that when arriving at the ride starting location, the final candidate car verifies, according to the security verification information, security verification information provided by a sender of the passenger request.

With reference to the first aspect, in a fifth possible implementation manner of the first aspect, after the delivering the ride request to the final candidate car, the method further includes updating planned route information of the final candidate car, and sending updated planned route information to the final candidate car, such that the final candidate car determines a driving route according to the updated planned route information.

With reference to the first aspect, in a sixth possible implementation manner of the first aspect, after the delivering the ride request to the final candidate car, the method further includes sending identifier information of the final candidate car to a sending terminal of the passenger request, such that a sender of the passenger request determines the final candidate car according to the identifier information of the final candidate car.

With reference to the first aspect or the first to sixth possible implementation manners of the first aspect, in a seventh possible implementation manner of the first aspect, the method further includes if the final candidate car does not exist among the multiple self-driving cars within the management range, performing scheduling again on a newly received ride request and all unexecuted ride requests, and sending a scheduling result to a corresponding self-driving car.

According to a second aspect, a car scheduling server is provided, the server including a ride request receiving module configured to receive a ride request, where the ride request includes at least a ride starting location, a ride destination, and an expected destination arrival time; a first candidate car determining module configured to determine, according to the ride request and driving information of self-driving cars within a management range, at least one first candidate car from the multiple self-driving cars; a first time calculation module configured to calculate, according to current location information, current road status information, and planned route information of each first candidate car, a first time required by each first candidate car to arrive at the ride destination, a final candidate car determining module configured to determine a final candidate car from the at least one first candidate car according to the first time corresponding to each first candidate car, where the final candidate car at least meets the expected destination arrival time; and a ride request delivery module configured to deliver the ride request to the final candidate car, such that the final candidate car responds to the ride request.

In a first possible implementation manner of the second aspect, the server further includes a driving information acquiring module configured to acquire the driving information of the self-driving cars within the management range, where the driving information includes at least current location information, current road status information, planned route information, and a planned destination arrival time, where the first candidate car determining module is configured to determine the at least one first candidate car from the multiple self-driving cars according to the ride starting location and the ride destination, where a planned route or an extended route of the planned route of the first candidate car includes the ride starting location and the ride destination.

With reference to the first possible implementation manner of the second aspect, in a second possible implementation manner of the second aspect, the server further includes a second candidate car determining module configured to, when the ride request includes ride sharing information and a quantity of passengers, determine, from the self-driving cars within the management range, at least one second candidate car that has vacant seats whose quantity is not less than the quantity of passengers and that agrees with ride sharing, where the first candidate car determining module is configured to determine the at least one first candidate car from the at least one second candidate car according to the ride starting location and the ride destination.

With reference to the second aspect, in a third possible implementation manner of the second aspect, the ride request delivery module is configured to deliver the ride request including the passenger information to the final candidate car, such that after arriving at the ride starting location, the final candidate car determines a sender of the ride request according to the passenger information, where the passenger information includes at least one of a passenger feature identifier or a passenger nearby typical road identifier.

With reference to the second aspect, in a fourth possible implementation manner of the second aspect, the server further includes a security verification information sending module configured to send security verification information of the final candidate car to a sending terminal of the passenger request, such that when arriving at the ride starting location, the final candidate car verifies, according to the security verification information, security verification information provided by a sender of the passenger request.

With reference to the second aspect, in a fifth possible implementation manner of the second aspect, the server further includes a planned route information update module configured to update planned route information of the final candidate car, and send updated planned route information to the final candidate car, such that the final candidate car determines a driving route according to the updated planned route information.

With reference to the second aspect, in a sixth possible implementation manner of the second aspect, the server further includes a car identifier information delivery module configured to send identifier information of the final candidate car to a sending terminal of the passenger request, such that a sender of the passenger request determines the final candidate car according to the identifier information of the final candidate car.

With reference to the second aspect or the first to sixth possible implementation manners of the second aspect, in a seventh possible implementation manner of the second aspect, the server further includes a scheduling module configured to, when the final candidate car does not exist among the multiple self-driving cars within the management range, perform scheduling again on a newly received ride request and all unexecuted ride requests, and send a scheduling result to a corresponding self-driving car.

According to a third aspect, a self-driving car scheduling method is provided, the method including receiving a ride request delivered by a car scheduling server, where the ride request includes at least a ride starting location, a ride destination, an expected destination arrival time, and passenger information; determining whether a ride request conflicting with the ride request exists in a driving task list;

if no ride request conflicting with the ride request exists in the driving task list, determining an execution order of the ride request according to the expected destination arrival time of the ride request, and adding the ride request to the driving task list according to the execution order of the ride request; and executing ride requests in sequence according to execution orders of the ride requests in the driving task list.

In a first possible implementation manner of the third aspect, after the adding the ride request to the driving task list according to the execution order of the ride request, the method further includes setting an execution status for the ride request, where the driving task list includes at least one ride request and an execution status corresponding to each ride request.

With reference to the third aspect, in a second possible implementation manner of the third aspect, the method further includes during execution of any ride request, upon arrival at a ride starting location corresponding to the ride request, performing precise matching and positioning on a current location of a sender of the ride request according to a passenger nearby typical road identifier included in the ride request, such that after the sender of the ride request confirms, according to received car identifier information, a self-driving car that arrives at the ride starting location, the self-driving car drives away from the ride starting location.

With reference to the third aspect or the second possible implementation manner of the third aspect, in a third possible implementation manner of the third aspect, the method further includes the following.

during execution of any ride request, upon arrival at a ride starting location corresponding to the ride request, confirming a sender of the ride request according to a passenger feature identifier included in the ride request, such that after the sender of the ride request confirms, according to received car identifier information, a self-driving car that arrives at the ride starting location, the self-driving car drives away from the ride starting location.

With reference to the third aspect, in a fourth possible implementation manner of the third aspect, the method further includes, after it is detected that a passenger performs a destination change operation on a user interface, updating the driving task list according to a changed destination.

With reference to the third aspect, in a fifth possible implementation manner of the third aspect, the method further includes, when it is detected that a traffic jam or a traffic accident occurs on a current driving route of the self-driving car, performing a ride request scheduling negotiation with the car scheduling server, to obtain a scheduling negotiation result; and updating the driving task list according to the scheduling negotiation result and transferring at least one subsequent ride request to another self-driving car.

With reference to the third aspect, in a sixth possible implementation manner of the third aspect, the method further includes, when it is detected that a traffic jam or a traffic accident occurs on a current driving route, performing a ride request scheduling negotiation with another self-driving car with which communication is established, to obtain a scheduling negotiation result; and updating the driving task list according to the scheduling negotiation result and transferring at least one subsequent ride request to the another self-driving car.

According to a fourth aspect, a self-driving car is provided, the car including a ride request receiving module configured to receive a ride request delivered by a car scheduling server, where the ride request includes at least a ride starting location, a ride destination, an expected destination arrival time, and passenger information; a ride request determining module configured to determine whether a ride request conflicting with the ride request exists in a driving task list; a ride request adding module configured to, when no ride request conflicting with the ride request exists in the driving task list, determine an execution order of the ride request according to the expected destination arrival time of the ride request, and add the ride request to the driving task list according to the execution order of the ride request; and an execution module configured to execute ride requests in sequence according to execution orders of the ride requests in the driving task list.

In a first possible implementation manner of the fourth aspect, the car further includes an execution status setting module configured to set an execution status for the ride request, where the driving task list includes at least one ride request and an execution status corresponding to each ride request.

With reference to the fourth aspect, in a second possible implementation manner of the fourth aspect, the car further includes a matching confirmation module configured to, during execution of any ride request, upon arrival at a ride starting location corresponding to the ride request, perform precise matching and positioning on a current location of a sender of the ride request according to a passenger nearby typical road identifier included in the ride request, such that after the sender of the ride request confirms, according to received car identifier information, the self-driving car that arrives at the ride starting location, the self-driving car drives away from the ride starting location.

With reference to the fourth aspect or the second possible implementation manner of the fourth aspect, in a third possible implementation manner of the fourth aspect, the matching confirmation module is further configured to, during execution of any ride request, upon arrival at a ride starting location corresponding to the ride request, confirm a sender of the ride request according to a passenger feature identifier included in the ride request, such that after the sender of the ride request confirms, according to received car identifier information, the self-driving car that arrives at the ride starting location, the self-driving car drives away from the ride starting location.

With reference to the fourth aspect, in a fourth possible implementation manner of the fourth aspect, the car further includes a driving task list update module configured to, after it is detected that a passenger performs a destination change operation on a UI, update the driving task list according to a changed destination.

With reference to the fourth aspect, in a fifth possible implementation manner of the fourth aspect, the car further includes a scheduling negotiation module configured to, when it is detected that a traffic jam or a traffic accident occurs on a current driving route of the self-driving car, perform a ride request scheduling negotiation with the car scheduling server, to obtain a scheduling negotiation result, where the driving task list update module is further configured to update the driving task list according to the scheduling negotiation result and transfer at least one subsequent ride request to another self-driving car.

With reference to the fourth aspect, in a sixth possible implementation manner of the fourth aspect, the scheduling negotiation module is further configured to, when it is detected that a traffic jam or a traffic accident occurs on a current driving route, perform a ride request scheduling negotiation with another self-driving car with which communication is established, to obtain a scheduling negotiation result; and the driving task list update module is further configured to update the driving task list according to the scheduling negotiation result and transfer at least one subsequent ride request to the another self-driving car.

A beneficial effect brought by the technical solutions provided in the embodiments of the present disclosure is that during self-driving car scheduling, car scheduling is performed according to at least a ride request, and current location information, current road status information, and planned route information of self-driving cars within a management range of a car scheduling server, and because reference factors for car scheduling are relatively varied, an obtained scheduling result is relatively precise, and scheduling precision is high.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
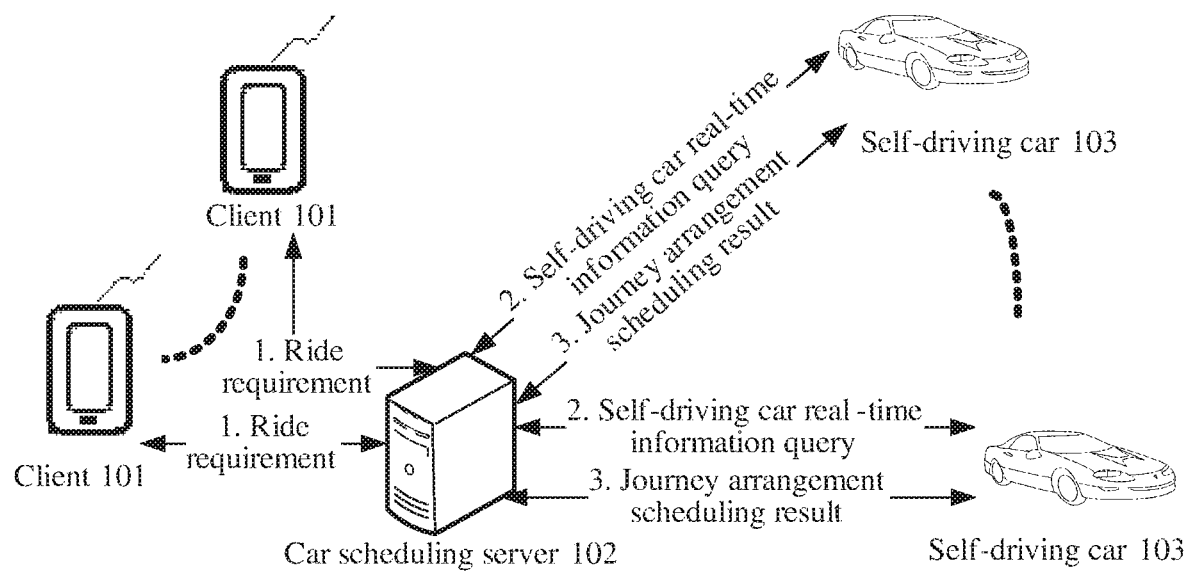
FIG. 1 is an architectural diagram of a self-driving car scheduling system according to an embodiment of the present disclosure.

Before the embodiments of the present disclosure are explained and described in detail, a system architecture and an application scenario of the embodiments of the present disclosure are first simply described. Referring to FIG. 1, a self-driving car scheduling system includes multiple clients 101, a car scheduling server 102, and multiple self-driving cars 103. The client 101 is configured to send a ride request of a passenger, where the ride request may include a ride starting location, a ride destination, an expected car starting location arrival time, an expected car destination arrival time, ride sharing information, and the like. The client 101 may be a mobile phone, a desktop computer, a tablet computer, a wearable device, or the like. The car scheduling server 102 is configured to perform scheduling on the multiple self-driving cars 103 within a management range according to a ride requirement, current locations of the multiple self-driving cars 103, current road status information, and an original scheduling result that are collected, and deliver a latest scheduling result to the self-driving cars 103. For the multiple self-driving cars 103, each self-driving car is located within a management range of the car scheduling server 102. The self-driving car 103 does not need to be driven by a driver and a driving task does not need to be manually arranged. Instead, the car scheduling server 102 automatically arranges a driving task for the self-driving cars 103 within the management range of the car scheduling server 102. Certainly, it is also supported that a passenger on the car changes a ride destination using a user interface (UI). After acquiring a driving task, the self-driving car may automatically plan and arrange a travel route according to the driving task.

Figure 2:
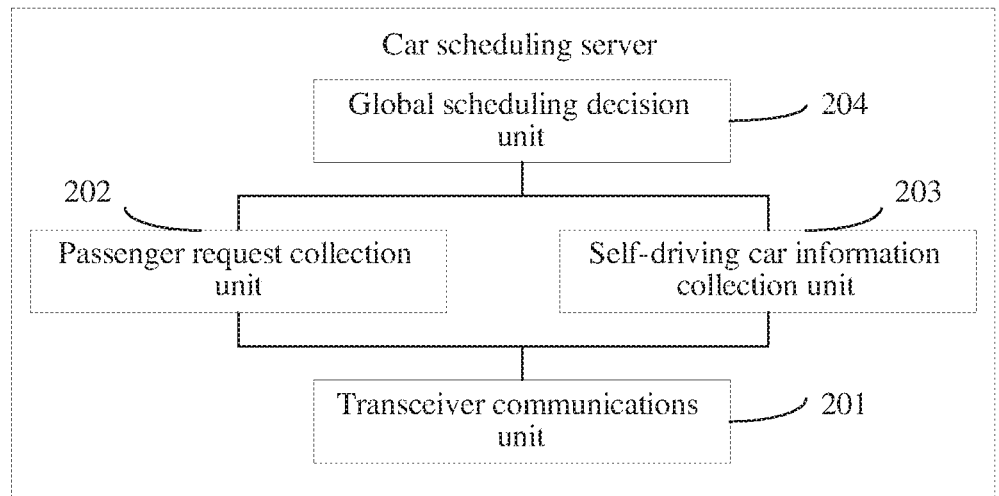
FIG. 2 is a schematic diagram of an internal structure of a car scheduling server according to an embodiment of the present disclosure.

Referring to FIG. 2, a car scheduling server mainly includes a transceiver communications unit 201, a ride request collection unit 202, a self-driving car information collection unit 203, and a global scheduling decision unit 204. The transceiver communications unit 201 is, on one hand configured to communicate with the client 101 shown in FIG. 1, to receive and respond to a ride request of a passenger. On the other hand configured to communicate with the self-driving cars 103 shown in FIG. 1, to receive driving information of the self-driving cars 103, where the driving information may include a current location, current road status information, a journey arrangement change request, and the like. The transceiver communications unit 201 may further deliver a driving arrangement scheduling result to the self-driving cars 103. The ride request collection unit 202 is configured to collect the ride request of the passenger, where the ride request generally includes an identity of the passenger, a ride starting location, an expected car arrival time, a ride destination, a quantity of passengers, an expected destination arrival time, ride sharing information, and the like. The self-driving car information collection unit 203 is configured to collect driving information of all self-driving cars within a management range of the car scheduling server. The driving information includes dynamic information and static information, the dynamic information generally includes a driving task, a current location, a driving task being performed, current road status information, and the like of a self-driving car. The static information generally includes identifier information of a self-driving car, for example, a license plate and a model. The global scheduling decision unit 204 is configured to perform global scheduling according to the passenger request acquired by the ride request collection unit 202 and the driving information of self-driving cars that is acquired by the self-driving car information collection unit 203, and calculate a journey scheduling result of an optimal self-driving car that can meet the ride request.

Figure 3:
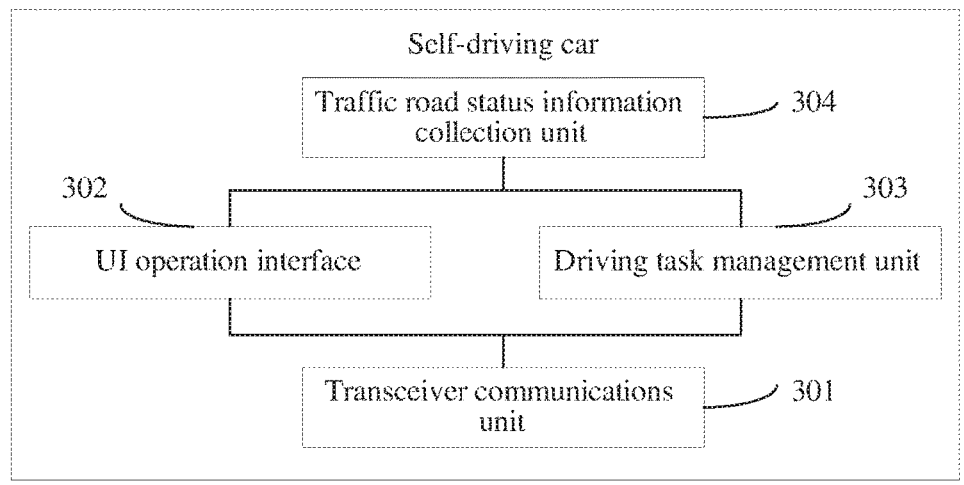
FIG. 3 is a schematic diagram of an internal structure of a self-driving car according to an embodiment of the present disclosure.

Referring to FIG. 3, a self-driving car mainly includes a transceiver communications unit 301, a UI operation interface 302, a driving task management unit 303, and a traffic road status information collection unit 304. The transceiver communications unit 301 is configured to communicate with a remote device such as a car scheduling server, to send driving information of the self-driving car, where the driving information may include a current location, current road status information, a journey arrangement change request, and the like. The UI operation interface 302 supports a passenger on the car to interact with the self-driving car using a UI. For example, the passenger may change a ride destination using the UI. The driving task management unit 303 is configured to maintain a driving task list of the self-driving car, and supports updating the driving task list according to the passenger request, a decision of the car scheduling server, or a local decision. The traffic road status information collection unit 304 is configured to collect a traffic status on a driving route of the self-driving car or at a current location of the self-driving car using a global positioning system (GPS) device or a traffic monitoring device.

Figure 4:
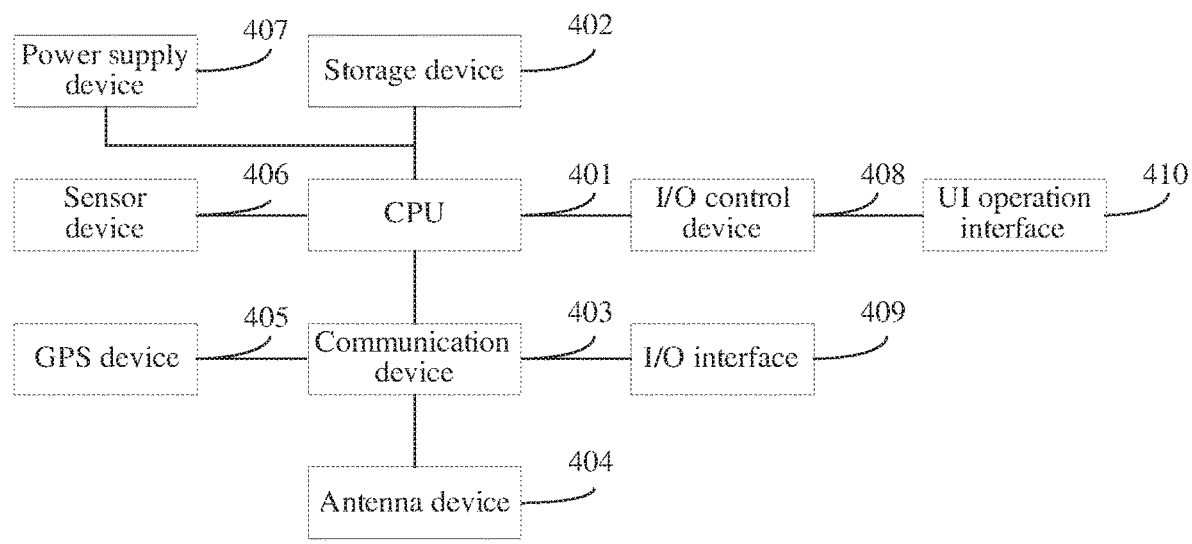
FIG. 4 is a schematic diagram of an overall hardware architecture of a self-driving car according to an embodiment of the present disclosure.

FIG. 4 is a schematic structural diagram of an overall hardware of a self-driving car. Referring to FIG. 4, the self-driving car includes the following.

A Central Processing Unit (CPU) 401 is, in one aspect configured to control constituent hardware devices of the entire self-driving car; and in another aspect configured to run operating system software and required application program software, which includes software of driving task management, traffic road status information collection, a UI operation interface, and the like that are involved in the present disclosure.

A storage device 402 is configured to store various software programs, data, and the like of the self-driving car. The storage device may be one or more of a random access memory (RAM), an erasable programmable read only memory (EPROM), a solid state disk (SSD), an (secure digital (SD) card, and a hard disk. Software functions of a self-driving car scheduling method provided in the embodiments of the present disclosure are also run and stored on the storage device 402.

A communications device 403 provides a network communication function to the self-driving car, where the network communication function includes one or more of communication manners such as a cellular network, for example global system for mobile communications (GSM)/universal mobile telecommunications service (UMTS)/long term evolution (LTE)/code division multiple access (CDMA) or the like, a wireless local area network (WLAN), near field communication (NFC), and Bluetooth.

An antenna device 404 is a radio transmit antenna or a radio receive antenna used by the communications device 403. A GPS device 405 is configured to provide location information of the self-driving car. A sensor device 406 may include a radar, a camera, and the like, and is configured to sense a road traffic environment, a pedestrian, and the like, so as to guide the self-driving car to perform self-driving according to a road status. A power supply device 407 supplies power to the self-driving car. An input/output (I/O) control device 408 is configured to control data exchange between various input/output devices, and particularly, control data exchange between the CPU 401 and an I/O interface 409 or a user interface (UI) operation interface 410.

The I/O interface 409 is an external interface provided by the self-driving car and includes one or more of a universal serial bus (USB) interface, an SD card interface, a compact disc (CD)/digital versatile disc (DVD) interface, and a press-key interface. The UI operation interface 410 is a graphical user interface (GUI) operation/display panel provided by the self-driving car, and is configured to display a running status of the self-driving car, a device status, an environment where the self-driving car is located, a user operation interface, and an operation result. The panel may also be a touchscreen, and is configured to receive a user touch operation and convert the user touch operation into a user operation instruction.

Figure 5:
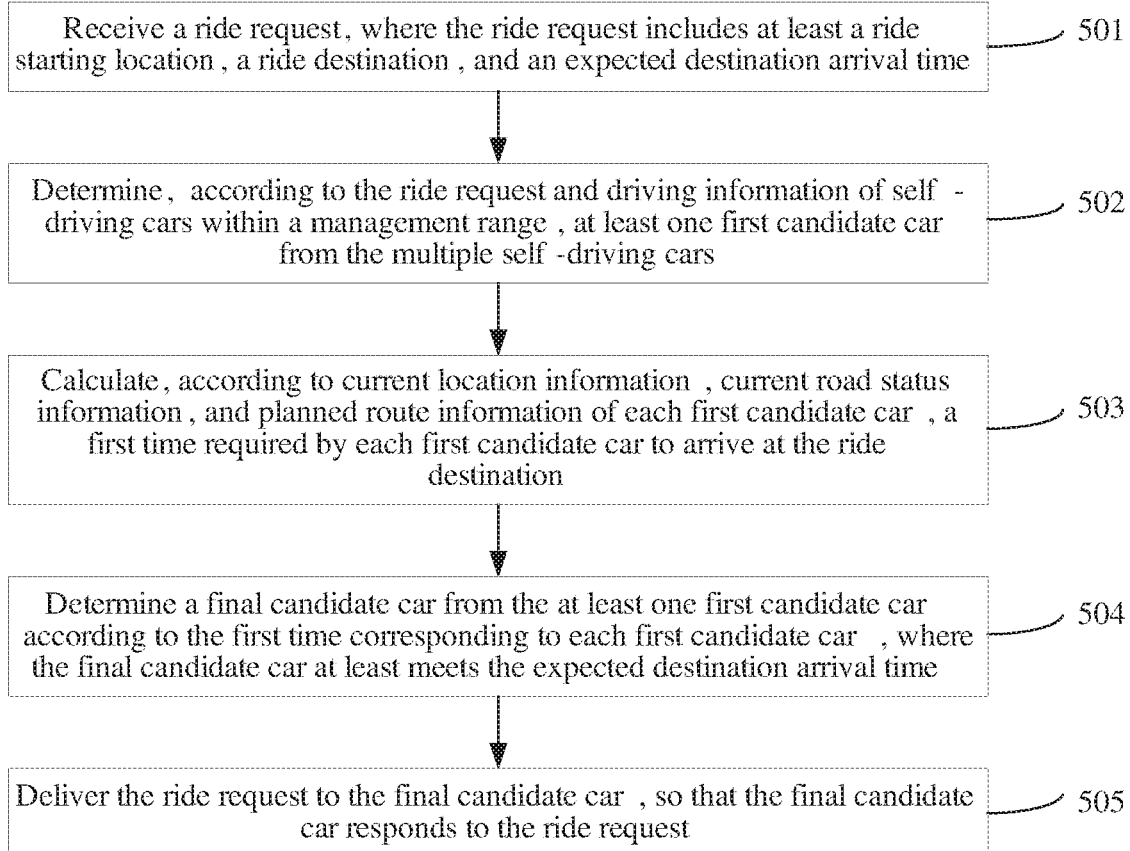
FIG. 5 is a flowchart of a self-driving car scheduling method according to an embodiment of the present disclosure.

FIG. 5 is a flowchart of a self-driving car scheduling method according to an embodiment of the present disclosure. The perspective in which a car scheduling server executes the method is used as an example. Referring to FIG. 5, a procedure of the method provided in this embodiment of the present disclosure includes the following.

501: Receive a ride request, where the ride request includes at least a ride starting location, a ride destination, and an expected destination arrival time.

502: Determine, according to the ride request and driving information of self-driving cars within a management range, at least one first candidate car from the multiple self-driving cars.

503: Calculate, according to current location information, current road status information, and planned route information of each first candidate car, a first time required by each first candidate car to arrive at the ride destination.

504: Determine a final candidate car from the at least one first candidate car according to the first time corresponding to each first candidate car, where the final candidate car at least meets the expected destination arrival time.

505: Deliver the ride request to the final candidate car, such that the final candidate car responds to the ride request.

In the method provided in this embodiment of the present disclosure, during self-driving car scheduling, car scheduling is performed according to at least a ride request, and current location information, current road status information, and planned route information of self-driving cars within a management range of a car scheduling server, and because reference factors for car scheduling are relatively varied, an obtained scheduling result is relatively precise, and scheduling precision is high.

Optionally, before the determining, according to the ride request and driving information of self-driving cars within a management range, at least one first candidate car from the multiple self-driving cars, the method further includes acquiring the driving information of the self-driving cars within the management range, where the driving information includes at least current location information, current road status information, planned route information, and a planned destination arrival time; and the determining, according to the ride request and driving information of self-driving cars within a management range, at least one first candidate car from the multiple self-driving cars includes determining the at least one first candidate car from the multiple self-driving cars according to the ride starting location and the ride destination, where a planned route or an extended route of the planned route of the first candidate car includes the ride starting location and the ride destination.

Optionally, before the determining the at least one first candidate car from the multiple self-driving cars according to the ride starting location and the ride destination, the method further includes, if the ride request includes ride sharing information and a quantity of passengers, determining, from the self-driving cars within the management range, at least one second candidate car that has vacant seats whose quantity is not less than the quantity of passengers and that agrees with ride sharing; and the determining the at least one first candidate car from the multiple self-driving cars according to the ride starting location and the ride destination includes determining the at least one first candidate car from the at least one second candidate car according to the ride starting location and the ride destination.

Optionally, the ride request further includes passenger information, and the delivering the ride request to the final candidate car includes delivering the ride request including the passenger information to the final candidate car, such that after arriving at the ride starting location, the final candidate car determines a sender of the ride request according to the passenger information, where the passenger information includes at least one of a passenger feature identifier or a passenger nearby typical road identifier.

Optionally, after the delivering the ride request to the final candidate car, the method further includes sending security verification information of the final candidate car to a sending terminal of the passenger request, such that when arriving at the ride starting location, the final candidate car verifies, according to the security verification information, security verification information provided by a sender of the passenger request.

Optionally, after the delivering the ride request to the final candidate car, the method further includes updating planned route information of the final candidate car, and sending updated planned route information to the final candidate car, such that the final candidate car determines a driving route according to the updated planned route information.

Optionally, after the delivering the ride request to the final candidate car, the method further includes sending identifier information of the final candidate car to a sending terminal of the passenger request, such that a sender of the passenger request determines the final candidate car according to the identifier information of the final candidate car.

Optionally, the method further includes, if the final candidate car does not exist among the multiple self-driving cars within the management range, performing scheduling again on a newly received ride request and all unexecuted ride requests, and sending a scheduling result to a corresponding self-driving car.

All the foregoing optional technical solutions can be randomly combined to form optional embodiments of the present disclosure, which are no longer elaborated one by one herein.

Figure 6:
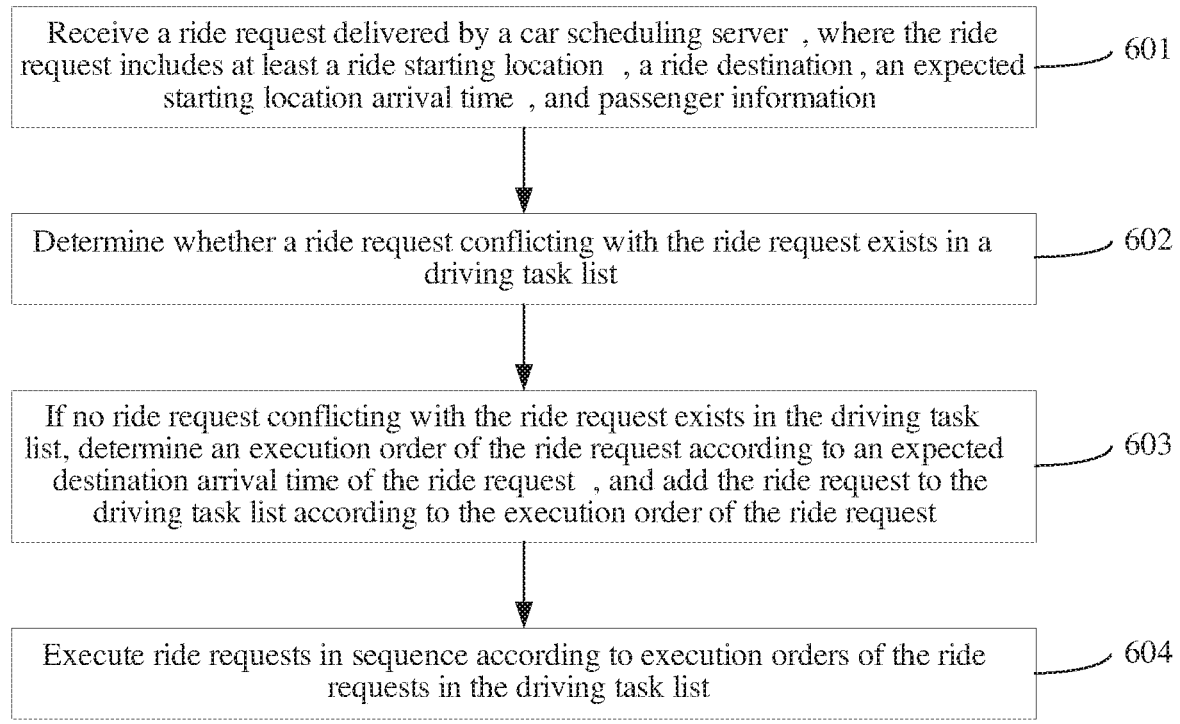
FIG. 6 is a flowchart of a self-driving car scheduling method according to an embodiment of the present disclosure.

FIG. 6 is a flowchart of a self-driving car scheduling method according to an embodiment of the present disclosure. The perspective in which a self-driving car executes the method is used as an example. Referring to FIG. 6, a procedure of the method provided in this embodiment of the present disclosure includes the following.

601: Receive a ride request delivered by a car scheduling server, where the ride request includes at least a ride starting location, a ride destination, an expected starting location arrival time, and passenger information.

602: Determine whether a ride request conflicting with the ride request exists in a driving task list.

603: If no ride request conflicting with the ride request exists in the driving task list, determine an execution order of the ride request according to an expected destination arrival time of the ride request, and add the ride request to the driving task list according to the execution order of the ride request.

604: Execute ride requests in sequence according to execution orders of the ride requests in the driving task list.

In the method provided in this embodiment of the present disclosure, during self-driving car scheduling, car scheduling is performed according to at least a ride request, and current location information, current road status information, and planned route information of self-driving cars within a management range of a car scheduling server, and because reference factors for car scheduling are relatively varied, an obtained scheduling result is relatively precise, and scheduling precision is high.

Optionally, after the adding the ride request to the driving task list according to the execution order of the ride request, the method further includes setting an execution status for the ride request, where the driving task list includes at least one ride request and an execution status corresponding to each ride request.

Optionally, the method further includes during execution of any ride request, upon arrival at a ride starting location corresponding to the ride request, performing precise matching and positioning on a current location of a sender of the ride request according to a passenger nearby typical road identifier included in the ride request, such that after the sender of the ride request confirms, according to received car identifier information, a self-driving car that arrives at the ride starting location, the self-driving car drives away from the ride starting location.

Optionally, the method further includes during execution of any ride request, upon arrival at a ride starting location corresponding to the ride request, confirming a sender of the ride request according to a passenger feature identifier included in the ride request, such that after the sender of the ride request confirms, according to received car identifier information, a self-driving car that arrives at the ride starting location, the self-driving car drives away from the ride starting location.

Optionally, the method further includes after it is detected that a passenger performs a destination change operation on a UI, updating the driving task list according to a changed destination.

Optionally, the method further includes, when it is detected that a traffic jam or a traffic accident occurs on a current driving route of a self-driving car, performing a ride request scheduling negotiation with the car scheduling server, to obtain a scheduling negotiation result; and updating the driving task list according to the scheduling negotiation result and transferring at least one subsequent ride request to another self-driving car.

Optionally, the method further includes, when it is detected that a traffic jam or a traffic accident occurs on a current driving route, performing a ride request scheduling negotiation with another self-driving car with which communication is established, to obtain a scheduling negotiation result; and updating the driving task list according to the scheduling negotiation result and transferring at least one subsequent ride request to the another self-driving car.

All the foregoing optional technical solutions can be randomly combined to form optional embodiments of the present disclosure, which are no longer elaborated one by one herein.

Figure 7:
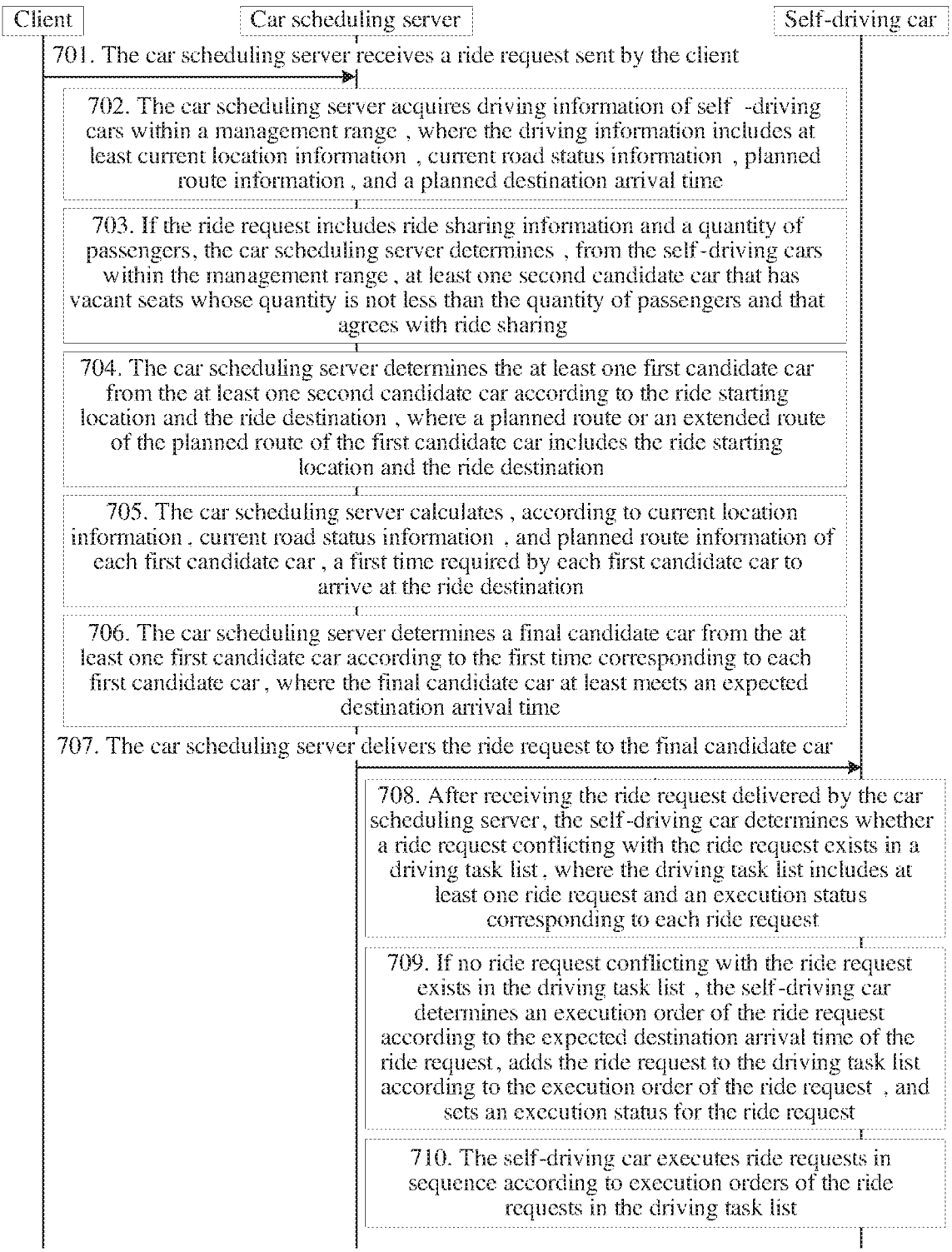
FIG. 7 is a flowchart of a self-driving car scheduling method according to an embodiment of the present disclosure.

FIG. 7 is a flowchart of a self-driving car scheduling method according to an embodiment of the present disclosure. Entities that perform interaction are a car scheduling server, a client, and a self-driving car. Referring to FIG. 7, a procedure of the method provided in this embodiment of the present disclosure includes the following.

701: A car scheduling server receives a ride request sent by a client, where the ride request includes at least a ride starting location, a ride destination, and an expected destination arrival time.

In this embodiment of the present disclosure, a specific implementation manner of sending the ride request by the client includes, but is not limited to, several manners in the following: sending the ride request using an app (application) on an intelligent mobile terminal; or, sending the ride request using a fixed terminal (personal computer); or, logging in to a corresponding website using an intelligent mobile terminal or a fixed terminal, and sending the ride request on a webpage.

In addition to the ride starting location, the ride destination, and the expected destination arrival time, the ride request may further include passenger information, an expected starting location arrival time, ride sharing information (whether it is okay to share a ride with another person), and the like. Content included in the ride request in this embodiment is not limited. In addition, the passenger information may include one or more of a username, an ID card number, an identifier (a digit string) or a passenger photograph. Content included in the passenger information in this embodiment is also not limited. The passenger information mainly helps a scheduled self-driving car to confirm the identity of a passenger when picking up the passenger.

702: The car scheduling server acquires driving information of self-driving cars within a management range, where the driving information includes at least current location information, current road status information, planned route information, and a planned destination arrival time.

In this embodiment of the present disclosure, the current location information of the self-driving car may be obtained using a GPS device. The current road status information may be obtained using a sensor device on the self-driving car, and a communications device of the self-driving car then sends the obtained current road status information to the car scheduling server. When acquiring the current road status information of the self-driving car, the car scheduling server may send the current location information of the self-driving car to a traffic monitoring device. The traffic monitoring device acquires the current road status information of each self-driving car according to the current location information of each self-driving car. Next, the traffic monitoring device sends the current road status information of each self-driving car to the car scheduling server.

When the method provided in this embodiment is performed, which manner in the foregoing is used to acquire the current road status information is not limited in this embodiment. The planned route information and the planned destination arrival time may be a latest scheduling result recorded in the server, or may be a latest scheduling result of which the car scheduling server is informed after some self-driving cars that can autonomously arrange a driving task change a driving task.

Besides, in addition to the current location information, the current road status information, the planned route information, and the planned destination arrival time, the driving information may further include a car remaining-seat quantity, a driving task list, ride sharing information, and the like. Content included in the driving information is not limited in this embodiment.

703: If the ride request includes ride sharing information and a quantity of passengers, the car scheduling server determines, from the self-driving cars within the management range, at least one second candidate car that has vacant seats whose quantity is not less than the quantity of passengers and that agrees with ride sharing.

During a peak period of car using, the car scheduling server may receive a large quantity of ride requests. A quantity of the ride requests may be far greater than a quantity of self-driving cars. In such a case, to meet ride requirements of passengers as much as possible, a solution of ride sharing is provided in this embodiment of the present disclosure, such that ride requirements of some of the passengers can be met to a certain extent. After the car scheduling server receives a new ride request, if the ride request includes the ride sharing information and the quantity of passengers, to find as soon as possible a self-driving car meeting the new ride request, the car scheduling server further needs to first determine, from the self-driving cars within the management range of the car scheduling server, the at least one second candidate car that has vacant seats whose quantity is not less than the quantity of passengers and that agrees with ride sharing. The reason of determining the ride sharing information is that for different passengers, some passengers accept ride sharing while some passengers may not accept ride sharing, and therefore during determining of the at least one second candidate car, a candidate car that agrees with ride sharing further needs to be selected.

During determining of the second candidate car, because the driving information, of each self-driving car, acquired by the car scheduling server includes the car remaining-seat quantity and the ride sharing information, the driving information of each self-driving car is analyzed, such that the at least one second candidate car can be determined from the multiple self-driving cars within the management range of the car scheduling server.

704: The car scheduling server determines the at least one first candidate car from the at least one second candidate car according to the ride starting location and the ride destination, where a planned route or an extended route of the planned route of the first candidate car includes the ride starting location and the ride destination.

In this embodiment of the present disclosure, when a new ride request is received, the new ride request may be a real-time ride request (where a passenger requires to get in a car as soon as possible), or may be a reservation ride request (where a passenger gets in a car within a reservation period of time). Regardless of whether the new ride request is a real-time ride request or a reservation ride request, at least one first candidate car needs to be determined from the at least one second candidate car according to a ride starting location and a ride destination of the new ride request, where a planned route of the at least one first candidate car includes or partially includes the ride starting location and the ride destination. During determining of at least one first candidate car, for the first candidate car, there are various cases as follows.

In a first case, at least one planned route of the first candidate car includes the ride starting location and the ride destination. That is, the ride starting location and the ride destination are intermediate sites on the planned route.

In a second case, at least one planned route of the first candidate car includes the ride starting location or the ride destination, and an extended route of the at least one planned route includes the ride destination or the ride starting location. That is, one of the ride starting location and the ride destination is a site on the planned route.

In a third case, an extended route of at least one planned route of the first candidate car includes the ride starting location and the ride destination. That is, neither the ride starting location nor the ride destination is an intermediate site on the planned route, and both the ride starting location and the ride destination are on the extended route of the planned route.

During determining of the first candidate car, a planned route of the at least one second candidate car may be analyzed, and the at least one first candidate car is determined from the at least one second candidate car according to the ride starting location and the ride destination of the new ride request.

705: The car scheduling server calculates, according to current location information, current road status information, and planned route information of each first candidate car, a first time required by each first candidate car to arrive at the ride destination.

After the at least one first candidate car is determined according to step 704, because a traffic status of a current route is usually not very desirable, a traffic accident or a traffic jam often occurs. Therefore, even if the at least one first candidate car is determined, the at least one first candidate car may fail to arrive at the ride starting location within a time required by a passenger, causing poor ride experience to the passenger. In consideration of the influence of a traffic factor, this embodiment of the present disclosure further includes a step of calculating a first time required by each first candidate car to arrive at the ride destination.

During calculation of a first time required by each first candidate car to arrive at the ride destination, the following manner may be used for implementation.

A self-driving car calculates the first time according to current location information, current road status information, and planned route information of the self-driving car, and then reports the first time to the car scheduling server; or, the scheduling server calculates the first time according to current location information, current road status information, and planned route information of each first candidate car. A calculation method is calculating a journey distance according to the current location information, the current road status information, and the planned route information of each first candidate car, and then calculating the first time according to the journey distance and a speed of the self-driving car. The journey distance may be calculated using time as a preferential reference, or may be calculated using distance as a preferential reference.

706: The car scheduling server determines a final candidate car from the at least one first candidate car according to the first time corresponding to each first candidate car, where the final candidate car at least meets the expected destination arrival time.

In this embodiment of the present disclosure, after the at least one first candidate car is determined according to step 704, the final candidate car further needs to be determined from the at least one candidate car according to the first time, calculated according to step 705, corresponding to each first candidate car. The final candidate car needs to be determined according to the following principle.

First, the final candidate car at least meets an expected starting location arrival time. That is, if a passenger specifies that a car arrives at the ride starting location at 4 p.m., the final candidate car selected from the at least one first candidate car needs to arrive at the ride starting location at 4 p.m. sharp.

Next, a new ride request does not affect an original ride request (a planned destination arrival time) of the final candidate car. For each self-driving car, while accepting the new ride request, the self-driving car may have multiple ride requests to be executed. When the final candidate car executes the new ride request, original ride requests should not be affected. For example, the new ride request requires a car to arrive at the ride starting location at 4 p.m., and one ride request of the original ride requests also requires arrival at 4 p.m.; in this case, the first candidate car cannot be used as the final candidate car.

In addition, if no final candidate car in the at least one first candidate car meets a requirement, the car scheduling server may further perform scheduling again on all unexecuted ride requests and the new ride request, so as to obtain an optimal driving arrangement, and deliver the obtained latest driving arrangement to a related self-driving car within the management range.

707: The car scheduling server delivers the ride request to the final candidate car.

In this embodiment of the present disclosure, after determining the final candidate car, the car scheduling server delivers the ride request to the final candidate car. After receiving the ride request, the final candidate car retrieves passenger information in the ride request. Upon arrival at the ride starting location, precise positioning and passenger identity confirmation are performed according to the passenger information. The ride information may include a featured picture provided by a passenger, for example, a typical road identifier; or may include a portrait photograph of a passenger, such that a self-driving car can perform image matching and recognition, to confirm identity information of the passenger.

Optionally, after the delivering the ride request to the final candidate car, the method further includes updating planned route information of the final candidate car, and sending updated planned route information to the final candidate car, such that the final candidate car determines a driving route according to the updated planned route information.

In this embodiment of the present disclosure, because a processing capability of the car scheduling server is more powerful as compared with a self-driving car, after delivering the ride request to the final candidate car, the car scheduling server further needs to update planned route information of the final candidate car, such that the final candidate car determines the driving route according to updated planned route information. Certainly, route planning information may also be updated by the self-driving car, which is not limited in this embodiment.

Optionally, after the delivering the ride request to the final candidate car, the method further includes sending identifier information of the final candidate car to a sending terminal of the passenger request, such that a sender of the passenger request determines the final candidate car according to the identifier information of the final candidate car.

In this embodiment of the present disclosure, the identifier information of the final candidate car may include license plate information, model information, and the like. Content included in the identifier information is not limited in this embodiment. Optionally, after the identifier information of the final candidate car is delivered to the sending terminal of the passenger request, a photograph and some other basic information of the final candidate car may be further sent to the sending terminal, such that the sender of the passenger request can conveniently confirm the final candidate car.

Additionally, if the safety of car using is considered, the car scheduling server may send some security verification information to the sender of the ride request (the passenger), such that when the passenger gets in the car, the passenger and the self-driving car perform security verification. The verification information may be a string of random digits or may be a two-dimensional code. The form of the security verification information is not limited in this embodiment. Optionally, the car scheduling server may send a driving password to the sending terminal of the ride request, such that the sending terminal of the ride request performs identity verification in, for example, an NFC manner using a switch-on password, so as to open the door of the final candidate car.

It should be noted that after determining, using step 701 to step 707, the final candidate car for executing a new ride request, the car scheduling server delivers the new ride request to the final candidate car. Further, the final candidate car may execute the new ride request, and for a detailed process, refer to step 708 to step 710 below.

708: After receiving the ride request delivered by the car scheduling server, the self-driving car determines whether a ride request conflicting with the ride request exists in a driving task list, where the driving task list includes at least one ride request and an execution status corresponding to each ride request.

In this embodiment of the present disclosure, for each self-driving car, a storage device of the self-driving car maintains a driving task list as shown in Table 1 below.

TABLE 1

| Execution order | Passenger information | Ride starting location | Ride destination | Expected starting location arrival time | Expected destination arrival time | Whether it is okay to share a ride | Execution status |
|---|---|---|---|---|---|---|---|
| 1 | A | Location a | Location b | 8:00 | 9:00 | No | Executed |
| 2 | B | Location c | Location d | 9:15 | 10:00 | Yes | Executing |
| 3 | C | Location e | Location f | 10:15 | 11:00 | Yes | Planning to execute |

After receiving the ride request delivered by the car scheduling server, the final candidate car first determines whether a ride request conflicting with the received ride request exists in a driving task list such as the one shown in FIG. 1. Conflicting ride requests refer to ride requests that have different ride starting locations and different ride destinations but share at least a same expected starting location arrival time or a same expected destination arrival time.

709: If no ride request conflicting with the ride request exists in the driving task list, the self-driving car determines an execution order of the ride request according to the expected destination arrival time of the ride request, adds the ride request to the driving task list according to the execution order of the ride request, and sets an execution status for the ride request.

In this embodiment of the present disclosure, when a new ride request is added to the driving task list, the new ride request is added according to an expected destination arrival time of the new ride request. That is, a driving task is arranged in ascending order of expected destination arrival times of ride requests. The execution status includes any state of "executed", "executing" or "planning to execute". An execution status corresponding to a ride request newly added to the driving task list is "planning to execute". In addition, if the ride request includes an expected starting location arrival time, when the ride request is added to the driving task list, an execution order of the ride request may also be determined according to both the expected destination arrival time and the expect starting location arrival time.

710: The self-driving car executes ride requests in sequence according to execution orders of the ride requests in the driving task list.

In this embodiment of the present disclosure, after the new ride request is added to the driving task list, the self-driving car executes ride requests in sequence according to execution orders of the ride requests in the new driving task list. After one ride request is executed, an execution status corresponding to the ride request and an execution status corresponding to a next ride request in the driving task list are changed.

Optionally, during execution of any ride request by the self-driving car, when the self-driving car arrives at the ride starting location, a sender of the ride request is confirmed using the following two manners.

In a first manner, when the self-driving car arrives at the ride starting location corresponding to the ride request, precise matching and positioning are performed on a current location of a sender of the ride request according to a passenger nearby typical road identifier included in the ride request, such that after the sender of the ride request confirms, according to received car identifier information, the self-driving car that arrives at the ride starting location, the self-driving car drives away from the ride starting location.

In a second manner, when the self-driving car arrives at the ride starting location corresponding to the ride request, a sender of the ride request is confirmed according to a passenger feature identifier included in the ride request, such that after the sender of the ride request confirms, according to received car identifier information, the self-driving car that arrives at the ride starting location, the self-driving car drives away from the ride starting location.

The passenger feature identifier may be an identifier or a passenger picture and the like of a passenger. The form of the passenger feature identifier is not limited in this embodiment of the present disclosure.

It should be noted that, after the new ride request is add to the driving task list in step 709, if the on-time completion of an existing ride request in the driving task list is affected, the self-driving car may feed back such a condition to the car scheduling server, and negotiate with the car scheduling server on how to adjust the driving task list.

Optionally, when the self-driving car scheduling method provided in this embodiment is performed, the following three manners of updating the driving task list of the self-driving car are further included in addition to the foregoing manner of updating the driving task list of the self-driving car according to the ride request delivered by the car scheduling server. Specific processes are as follows.

In a first manner, after it is detected that a passenger performs a destination change operation on a UI, the driving task list is updated according to a changed destination.

For the first manner, after a passenger gets in a car, based on the consideration of a traffic status in front and a condition of the passenger, the passenger may temporarily change a ride destination. To make it easy for the passenger to change the ride destination during the journey, in the method provided in this embodiment, a UI operation interface is further provided. The UI operation interface is usually a touchscreen, and supports that a user manually changes the ride destination, and after the user changes the ride destination, update of the driving task list is triggered once.

For the second manner, when it is detected that a traffic jam or a traffic accident occurs on a current driving route of the self-driving car, a ride request scheduling negotiation is performed with the car scheduling server, to obtain a scheduling negotiation result; and the driving task list is updated according to the scheduling negotiation result, and at least one subsequent ride request is transferred to another self-driving car.

For the second manner, to improve ride experience of a passenger, for a self-driving car, if a traffic jam or a traffic accident occurs on a current driving route, and the situation does not improve within a short time, to avoid affecting on-time completion of a subsequent ride request in the driving task list, in the method provided in this embodiment, a measure of negotiating with the car scheduling server and transferring and distributing at least one subsequent ride request is used. That is, when detecting that a traffic jam or a traffic accident occurs on a current driving route, the self-driving car performs a ride request scheduling negotiation with the car scheduling server, to obtain a scheduling negotiation result; according to the scheduling negotiation result, the driving task list is updated, and a successfully transferred ride request is deleted from the driving task list, or an execution status is changed to "transferred"; and at the same time, at least one subsequent ride request is distributed to another self-driving car, such that the another self-driving car executes the distributed subsequent ride request.

It should be noted that when a subsequent ride request is transferred, it may be transferred by the self-driving car or may be transferred by the car scheduling server. Whether a subsequent ride request is transferred by the self-driving car or the car scheduling server is not limited in this embodiment of the present disclosure.

In a third manner, when it is detected that a traffic jam or a traffic accident occurs on a current driving route, a ride request scheduling negotiation is performed with another self-driving car with which communication is established, to obtain a scheduling negotiation result; and the driving task list is updated according to the scheduling negotiation result and at least one subsequent ride request is transferred to the another self-driving car.

For the third manner, to improve ride experience of a passenger, for a self-driving car, if a traffic jam or a traffic accident occurs on a current driving route, and the situation does not improve within a short time, to avoid affecting on-time completion of a subsequent ride request in the driving task list, in the method provided in this embodiment, a measure of negotiating with another self-driving car and transferring and distributing at least one subsequent ride request is used. That is, when detecting that a traffic jam or a traffic accident occurs on a current driving route, the self-driving car performs a ride request scheduling negotiation with the car scheduling server, to obtain a scheduling negotiation result; according to the scheduling negotiation result, the driving task list is updated, or an execution status is changed to "transferred"; and at the same time, at least one subsequent ride request is distributed to another self-driving car, such that the another self-driving car executes the distributed subsequent ride request.

It should be noted that when a subsequent ride request is transferred, it may be transferred by the self-driving car or may be transferred by the car scheduling server. Whether a subsequent ride request is transferred by the self-driving car or the car scheduling server is not limited in this embodiment of the present disclosure.

In the method provided in this embodiment of the present disclosure, during self-driving car scheduling, car scheduling is performed according to at least a ride request, and current location information, current road status information, and planned route information of self-driving cars within a management range of a car scheduling server, such that an obtained scheduling result is relatively precise, scheduling precision is high, a passenger is more satisfied with a car scheduling result, and ride experience of the passenger is relatively desirable.

Figure 8:
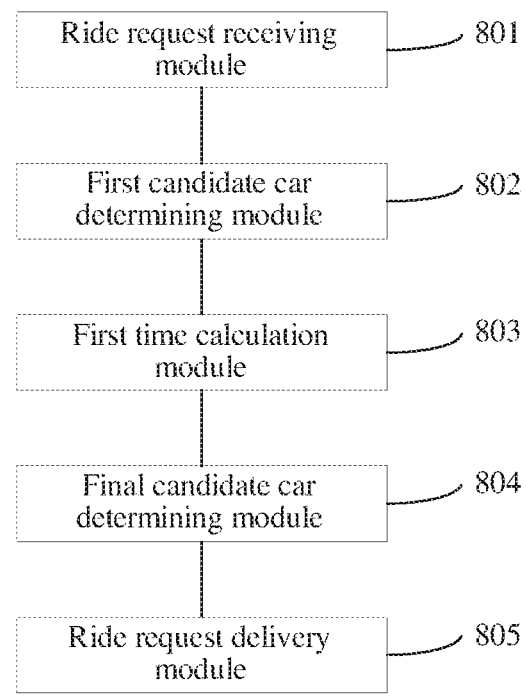
FIG. 8 is a schematic structural diagram of a car scheduling server according to an embodiment of the present disclosure.

FIG. 8 shows a car scheduling server according to an embodiment of the present disclosure. Referring to FIG. 8, the scheduling server includes a ride request receiving module 801, a first candidate car determining module 802, a first time calculation module 803, a final candidate car determining module 804, and a ride request delivery module 805.

The ride request receiving module 801 is configured to receive a ride request, where the ride request includes at least a ride starting location, a ride destination, and an expected destination arrival time; the first candidate car determining module 802 is connected to the ride request receiving module 801, and is configured to determine, according to the ride request and driving information of self-driving cars within a management range, at least one first candidate car from the multiple self-driving cars; the first time calculation module 803 is connected to the first candidate car determining module 802, and is configured to calculate, according to current location information, current road status information, and planned route information of each first candidate car, a first time required by each first candidate car to arrive at the ride destination; the final candidate car determining module 804 is connected to the first time calculation module 803, and is configured to determine a final candidate car from the at least one first candidate car according to the first time corresponding to each first candidate car, where the final candidate car at least meets the expected destination arrival time; and the ride request delivery module 805 is connected to the final candidate car determining module 804, and is configured to deliver the ride request to the final candidate car, such that the final candidate car responds to the ride request.

Optionally, the server further includes a driving information acquiring module configured to acquire the driving information of the self-driving cars within the management range, where the driving information includes at least current location information, current road status information, planned route information, and a planned destination arrival time, where the first candidate car determining module is configured to determine the at least one first candidate car from the multiple self-driving cars according to the ride starting location and the ride destination, where a planned route or an extended route of the planned route of the first candidate car includes the ride starting location and the ride destination.

Optionally, the server further includes a second candidate car determining module configured to, when the ride request includes ride sharing information and a quantity of passengers, determine, from the self-driving cars within the management range, at least one second candidate car that has vacant seats whose quantity is not less than the quantity of passengers and that agrees with ride sharing, where the first candidate car determining module is configured to determine the at least one first candidate car from the at least one second candidate car according to the ride starting location and the ride destination.

Optionally, the ride request delivery module is configured to deliver the ride request including passenger information to the final candidate car, such that after arriving at the ride starting location, the final candidate car determines a sender of the ride request according to the passenger information, where the passenger information includes at least one of a passenger feature identifier or a passenger nearby typical road identifier.

Optionally, the server further includes a security verification information sending module configured to send security verification information of the final candidate car to a sending terminal of the passenger request, such that when arriving at the ride starting location, the final candidate car verifies, according to the security verification information, security verification information provided by a sender of the passenger request.

Optionally, the server further includes a planned route information update module configured to update planned route information of the final candidate car, and send updated planned route information to the final candidate car, such that the final candidate car determines a driving route according to the updated planned route information.

Optionally, the server further includes a car identifier information delivery module configured to send identifier information of the final candidate car to a sending terminal of the passenger request, such that a sender of the passenger request determines the final candidate car according to the identifier information of the final candidate car.

Optionally, the server further includes a scheduling module configured to, when the final candidate car does not exist among the multiple self-driving cars within the management range, perform scheduling again on a newly received ride request and all unexecuted ride requests, and send a scheduling result to a corresponding self-driving car.

In conclusion, for the server provided in this embodiment of the present disclosure, during self-driving car scheduling, car scheduling is performed according to at least a ride request, and current location information, current road status information, and planned route information of self-driving cars within a management range of the car scheduling server, and because reference factors for car scheduling are relatively varied, an obtained scheduling result is relatively precise, and scheduling precision is high, a passenger is more satisfied with a car scheduling result, and ride experience of the passenger is relatively desirable.

Figure 9:
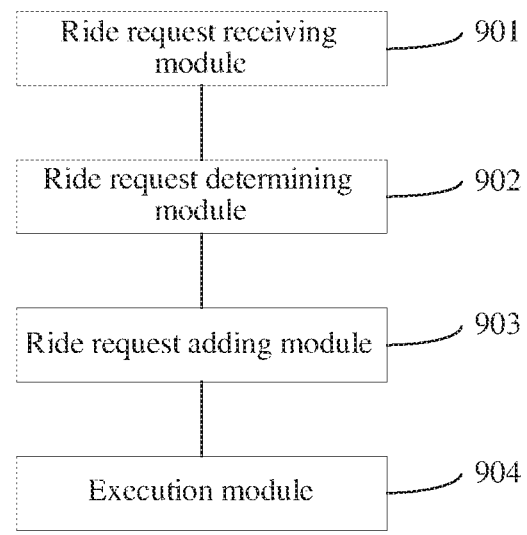
FIG. 9 is a schematic structural diagram of a self-driving car according to an embodiment of the present disclosure.

FIG. 9 is a schematic structural diagram of a self-driving car according to an embodiment of the present disclosure. Referring to FIG. 9, the car includes a ride request receiving module 901, a ride request determining module 902, a ride request adding module 903, and an execution module 904.

The ride request receiving module 901 is configured to receive a ride request delivered by a scheduling server, where the ride request includes at least a ride starting location, a ride destination, an expected destination arrival time, and passenger information; the ride request determining module 902 is connected to the ride request receiving module 901, and is configured to determine whether a ride request conflicting with the ride request exists in a driving task list; the ride request adding module 903 is connected to the ride request determining module 902, and is configured to, when no ride request conflicting with the ride request exists in the driving task list, determine an execution order of the ride request according to the expected destination arrival time of the ride request, and add the ride request to the driving task list according to the execution order of the ride request; and the execution module 904 is connected to the ride request adding module 903, and is configured to execute ride requests in sequence according to execution orders of the ride requests in the driving task list.

Optionally, the car further includes an execution status setting module configured to set an execution status for the ride request, where the driving task list includes at least one ride request and an execution status corresponding to each ride request.

Optionally, the car further includes a matching confirmation module configured to during execution of any ride request, upon arrival at a ride starting location corresponding to the ride request, perform precise matching and positioning on a current location of a sender of the ride request according to a passenger nearby typical road identifier included in the ride request, such that after the sender of the ride request confirms, according to received car identifier information, the self-driving car that arrives at the ride starting location, the self-driving car drives away from the ride starting location.

Optionally, the matching confirmation module is further configured to during execution of any ride request, upon arrival at a ride starting location corresponding to the ride request, confirm a sender of the ride request according to a passenger feature identifier included in the ride request, such that after the sender of the ride request confirms, according to received car identifier information, the self-driving car that arrives at the ride starting location, the self-driving car drives away from the ride starting location.

Optionally, the car further includes, a driving task list update module configured to, after it is detected that a passenger performs a destination change operation on a UI, update the driving task list according to a changed destination.

Optionally, the car further includes a scheduling negotiation module configured to, when it is detected that a traffic jam or a traffic accident occurs on a current driving route of the self-driving car, perform a ride request scheduling negotiation with the scheduling server, to obtain a scheduling negotiation result, where the driving task list update module is further configured to update the driving task list according to the scheduling negotiation result and transfer at least one subsequent ride request to another self-driving car.

Optionally, the scheduling negotiation module is further configured to, when it is detected that a traffic jam or a traffic accident occurs on a current driving route, perform a ride request scheduling negotiation with another self-driving car with which communication is established, to obtain a scheduling negotiation result; and the driving task list update module is further configured to update the driving task list according to the scheduling negotiation result and transfer at least one subsequent ride request to the another self-driving car.

For the self-driving car provided in the embodiment of the present disclosure, during self-driving car scheduling, car scheduling is performed according to at least a ride request, and current location information, current road status information, and planned route information of self-driving cars within a management range of a car scheduling server, and because reference factors for car scheduling are relatively varied, an obtained scheduling result is relatively precise, and scheduling precision is high, a passenger is more satisfied with a car scheduling result, and ride experience of the passenger is relatively desirable.

It should be noted that when the car scheduling server and the self-driving car provided in the foregoing embodiments perform self-driving car scheduling, the foregoing division of functional modules is only used as an example for description. In embodiment applications, the foregoing functions may be allocated to be accomplished by different functional modules according to needs, that is, the internal structures of the server and the car are divided into different functional modules to accomplish all or some of the functions described above. In addition, the car scheduling server and the self-driving car provided in the foregoing embodiments share the same concept with the embodiments of the self-driving car scheduling method; reference may be made to the method embodiments for the specific implementation processes of the car scheduling server and the self-driving car, and details are not described herein again.

A person of ordinary skill in the art may understand that all or some of the steps of the embodiments may be implemented by hardware or a program instructing related hardware. The program may be stored in a computer-readable storage medium. The storage medium may include a ROM, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for scheduling a self-driving car implemented by a hardware processor of the self-driving car, comprising:
    receiving a ride request from a car scheduling server that determines the self-driving car to receive the ride request, wherein the ride request comprises a ride starting location, a ride destination, and an expected destination arrival time;
    determining whether another ride request that conflicts with the ride request exists in a driving task list that includes a plurality of ride requests;
    determining an execution order of the ride request according to the expected destination arrival time of the ride request when the another ride request that conflicts with the ride request does not exist in the driving task list;
    adding the ride request to the driving task list according to the execution order of the ride request;
    executing the plurality of ride requests in sequence according to the execution orders of the plurality of ride requests in the driving task list;
    confirming, during execution of any ride request from the driving task list, a sender of the ride request upon arrival at the ride starting location according to a passenger feature identifier comprised in the ride request such that the self-driving car drives away from the ride starting location after the sender of the ride request confirms the self-driving car according to received car identifier information of the self-driving car;
    performing a ride request scheduling negotiation with another self-driving car with which communication is established to obtain a scheduling negotiation result when a traffic jam or a traffic accident occurs on a current driving route of the self-driving car;
    updating the driving task list according to the scheduling negotiation result; and
    transferring at least one subsequent ride request to another self-driving car after updating the driving task list.

2. The method of claim 1, wherein after adding the ride request to the driving task list according to the execution order of the ride request, the method further comprises setting an execution status for the ride request, and wherein the driving task list comprises an execution status that corresponds to at least one ride request in the driving task list.

3. The method of claim 1, wherein the ride requests include passenger identity information comprising an image of a sender of the ride request, and wherein the method further comprises performing, during execution of any ride request from the driving task list, matching the passenger identity information with the sender of the ride request upon arrival at the ride starting location such that the self-driving car drives away from the ride starting location after the sender of the ride request confirms the self-driving car according to car identifier information of the self-driving car, and wherein the ride starting location corresponds to the ride request.

4. The method of claim 3, wherein the ride requests include positioning information comprising a typical road identifier, and wherein the method further comprises performing positioning on a current location of the sender of the ride request upon arrival at the ride starting location according to the typical road identifier such that the self-driving car drives away from the ride starting location after the sender of the ride request confirms the self-driving car according to car identifier information of the self-driving car, and wherein the ride starting location corresponds to the ride request.

5. The method of claim 1, further comprising:
    detecting that a passenger performs a destination change operation on a user interface; and
    updating the driving task list according to a changed destination after detecting that the passenger performs the destination change operation on the user interface.

6. The method of claim 1, wherein the method further comprises detecting occurrence of the traffic jam or the traffic accident on the current driving route of the self-driving car.

7. A self-driving car, comprising:
    a memory comprising instructions; and
    a hardware processor coupled to the memory and configured to execute the instructions, wherein the instructions cause the hardware processor to:
        receive a ride request from a car scheduling server that determines the self-driving car to receive the ride request, wherein the ride request comprises at least a ride starting location, a ride destination, and an expected destination arrival time;
        determine whether another ride request that conflicts with the ride request exists in a driving task list that includes a plurality of ride requests;
        determine an execution order of the ride request according to the expected destination arrival time of the ride request when the another ride request that conflicts with the ride request does not exist in the driving task list;
        add the ride request to the driving task list according to the execution order of the ride request;
        execute the plurality of ride requests in sequence according to the execution orders of the plurality of ride requests in the driving task list; and
        confirm, during execution of any ride request from the driving task list, a sender associated with the ride request upon arrival at the ride starting location according to a passenger feature identifier comprised in the ride request such that the self-driving car drives away from the ride starting location after car identifier information of the self-driving car is confirmed;

perform a ride request scheduling negotiation with another self-driving car with which communication is established to obtain a scheduling negotiation result when a traffic jam or a traffic accident occurs on the current driving route of the self-driving car;

update the driving task list according to the scheduling negotiation result; and transfer at least one subsequent ride request to another self-driving car after updating the driving task list.

8. The self-driving car of claim 7, wherein the instructions further cause the hardware processor to be configured to set an execution status for the ride request, and wherein the driving task list comprises an execution status that corresponds to at least one ride request in the driving task list.

9. The self-driving car of claim 7, wherein the ride requests include positioning information comprising a typical road identifier and passenger identity information comprising an image of a sender of the ride request, and wherein the instructions further cause the hardware processor to be configured to perform, during execution of any ride request from the driving task list, matching the passenger identity information with the sender of the ride request upon arrival at the ride starting location such that the self-driving car drives away from the ride starting location after the sender of the ride request confirms the self-driving car according to car identifier information of the self-driving car, and wherein the ride starting location corresponds to the ride request.

10. The self-driving car of claim 7, wherein the instructions further cause the hardware processor to be configured to:

detect that a passenger performs a destination change operation on a user interface; and update the driving task list according to a changed destination after detecting that the passenger performs the destination change operation on the user interface.

11. The self-driving car of claim 7, wherein the instructions further cause the hardware processor to be configured to detect an occurrence of the traffic jam or the traffic accident on the current driving route of the self-driving car.

12. The self-driving car of claim 7, wherein the ride requests include positioning information comprising a typical road identifier, and wherein the instructions further cause the hardware processor to be configured to perform positioning on a current location of a sender of the ride request upon arrival at the ride starting location according to the typical road identifier such that the self-driving car drives away from the ride starting location after the sender of the ride request confirms the self-driving car according to car identifier information of the self-driving car, and wherein the ride starting location corresponds to the ride request.

13. A non-transitory computer readable storage medium comprising instructions that when executed by a processor on a self-driving car cause the processor to:

receive a ride request from a car scheduling server that determines the self-driving car to receive the ride request, wherein the ride request comprises at least a ride starting location, a ride destination, and an expected destination arrival time;

determine whether another ride request that conflicts with the ride request exists in a driving task list that includes a plurality of ride requests;

determine an execution order of the ride request according to the expected destination arrival time of the ride request when the another ride request that conflicts with the ride request does not exist in the driving task list;

add the ride request to the driving task list according to the execution order of the ride request;

execute the plurality of ride requests in sequence according to the execution orders of the plurality of ride requests in the driving task list;

confirm, during execution of any ride request from the driving task list, a sender associated with the ride request upon arrival at the ride starting location according to a passenger feature identifier comprised in the ride request such that the self-driving car drives away from the ride starting location after car identifier information of the self-driving car is confirmed;

perform a ride request scheduling negotiation with another self-driving car with which communication is established to obtain a scheduling negotiation result when a traffic jam or a traffic accident occurs on the current driving route of the self-driving car;

update the driving task list according to the scheduling negotiation result; and transfer at least one subsequent ride request to another self-driving car after updating the driving task list.

14. The non-transitory computer readable storage medium of claim 13, wherein the instructions further cause the processor to be configured to set an execution status for the ride request, and wherein the driving task list comprises an execution status that corresponds to at least one ride request.

15. The non-transitory computer readable storage medium of claim 13, wherein the ride requests include passenger identity information comprising an image of a sender of the ride request, and wherein the instructions further cause the processor to be configured to perform, during execution of any ride request from the driving task list, matching the passenger identity information with the sender of the ride request upon arrival at the ride starting location such that the self-driving car that arrives at the ride starting location drives away from the ride starting location after the sender of the ride request confirms the self-driving car according to car identifier information of the self-driving car, and wherein the ride starting location corresponds to the ride request.

16. The non-transitory computer readable storage medium of claim 13, wherein the instructions further cause the processor to be configured to:

detect that a passenger performs a destination change operation on a user interface; and update the driving task list according to a changed destination after detecting that the passenger performs the destination change operation on the user interface.

17. The non-transitory computer readable storage medium of claim 13, wherein the instructions further cause the processor to be configured to detect an occurrence of the traffic jam or the traffic accident on the current driving route of the self-driving car.

18. The non-transitory computer readable storage medium of claim 13, wherein the ride requests include positioning information comprising a typical road identifier, and wherein the instructions further cause the processor to be configured to perform, during execution of any ride request from the driving task list, positioning on a current location of the sender of the ride request upon arrival at the ride starting location according to the typical road identifier such that the self-driving car that arrives at the ride starting location drives away from the ride starting location after the sender of the ride request confirms the self-driving car according to car identifier information of the self-driving car, and wherein the ride starting location corresponds to the ride request.

\* \* \* \* \*

UNITED STATES PATENT AND TRADEMARK OFFICE
CERTIFICATE OF CORRECTION

PATENT NO. : 11,340,631 B2
APPLICATION NO. : 16/527871
DATED : May 24, 2022
INVENTOR(S) : Huimin Zhang It is certified that error appears in the above-identified patent and that said Letters Patent is hereby corrected as shown below:

In the Claims

Claim 7, Column 24, Line 47: "comprises at least a" should read "comprises a"

Signed and Sealed this
Twelfth Day of July, 2022

Katherine Kelly Vidal
*Director of the United States Patent and Trademark Office*